US012496528B2

(12) United States Patent
Hernandez et al.

(10) Patent No.: US 12,496,528 B2
(45) Date of Patent: Dec. 16, 2025

(54) TASK-BASED INCENTIVE PROGRAM FOR GAMING ENVIRONMENT

(71) Applicant: Dell Products L.P., Round Rock, TX (US)

(72) Inventors: Robert C. Hernandez, Morrisville, NC (US); Erik Summa, Austin, TX (US); David Joseph Zavelson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 428 days.

(21) Appl. No.: 18/065,909

(22) Filed: Dec. 14, 2022

(65) Prior Publication Data

US 2024/0198234 A1 Jun. 20, 2024

(51) Int. Cl.
*A63F 13/69* (2014.01)
*A63F 13/216* (2014.01)

(52) U.S. Cl.
CPC ............ *A63F 13/69* (2014.09); *A63F 13/216* (2014.09)

(58) Field of Classification Search
CPC ............................... A63F 13/69; A63F 13/216
See application file for complete search history.

(56) References Cited

U.S. PATENT DOCUMENTS 9,561,433 B1 * 2/2017 Pieron .................... A63F 13/798
2002/0090985 A1 * 7/2002 Tochner ................ A63F 13/822 463/9
2013/0225282 A1 * 8/2013 Williams ............ G07F 17/3218 463/29

* cited by examiner

*Primary Examiner* — Kevin Y Kim
(74) *Attorney, Agent, or Firm* — Norton Rose Fulbright US LLP

(57) ABSTRACT

Systems and methods described herein may provide a system that enables game play or other application sessions to consumption devices of a user's choice as a reward upon completion of tasks assigned to the user. A method may include monitoring, by an information handing system, a task assigned to be completed by a user; determining, by the information handling system, completion of the task by the user based, at least in part, on a physical location tracking of the user, wherein the physical location tracking of the user comprises: monitoring, by the information handling system, a controller; and comparing, by the information handling system, monitored controller movements to a known map stored on the information handling system; and granting, by the information handling system, a reward to the user. Other aspects are also disclosed.

17 Claims, 11 Drawing Sheets

TASK-BASED INCENTIVE PROGRAM FOR GAMING ENVIRONMENT

FIELD OF THE DISCLOSURE

The instant disclosure relates to information handling systems. More specifically, portions of this disclosure relate to execution of applications in a multi-room user environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Aspects of embodiments of this disclosure implement an incentive system to encourage users to complete tasks assigned to them. Parents and other supervisors find it increasingly difficult to manage the game content, services, communications, and overall experiences of their children in age and maturity-appropriate ways. This disclosure implements a rewards program to incentivize the user to complete tasks in exchange for various rewards, such as usage of digital media or gameplay. Tasks may be determined if completed based on physical location trackers, such as by tracking user devices including mobile devices and gaming controllers and/or by receiving information from environmental sensors. The completion of tasks may be determined based on heuristics involving these location trackers and environmental sensors.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, may include monitoring, by the information handing system, a task assigned to be completed by a user; determining, by the information handling system, completion of the task by the user based, at least in part, on a physical location tracking of the user, wherein the physical location tracking of the user comprises: monitoring, by the information handling system, a controller; and comparing, by the information handling system, monitored controller movements to a known map stored on the information handling system; and granting, by the information handling system, a reward to the user.

In certain embodiments, the task and reward are determined by an administrator, such as a parent or guardian of the user.

In some embodiments, the known map stored on the information handling system comprises at least one target location. The target location may be a specific room in the user's home or an area in the user's gaming environment.

The target location may be the location of a target object associated with the task assigned to the user according to some embodiments.

In certain embodiments, determining completion of the task by the user comprises receiving an indication of completion from at least one peripheral of the information handling system. The indication may include external input from the user or administrator, indication of the user's physical location in an area for a certain period of time, or other external inputs from a plurality of sources.

In certain embodiments, the reward granted to the user comprises at least one of: time allocation for use of digital media; enabling of in-game features, digital currency for in-game purchases, or an in-game reward.

In some embodiments, the method may further include blocking, by the information handling system, access to digital media until the task is determined to be completed.

In some embodiments, the method may further include sending, by the information handling system, a notification to the user to complete the task.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
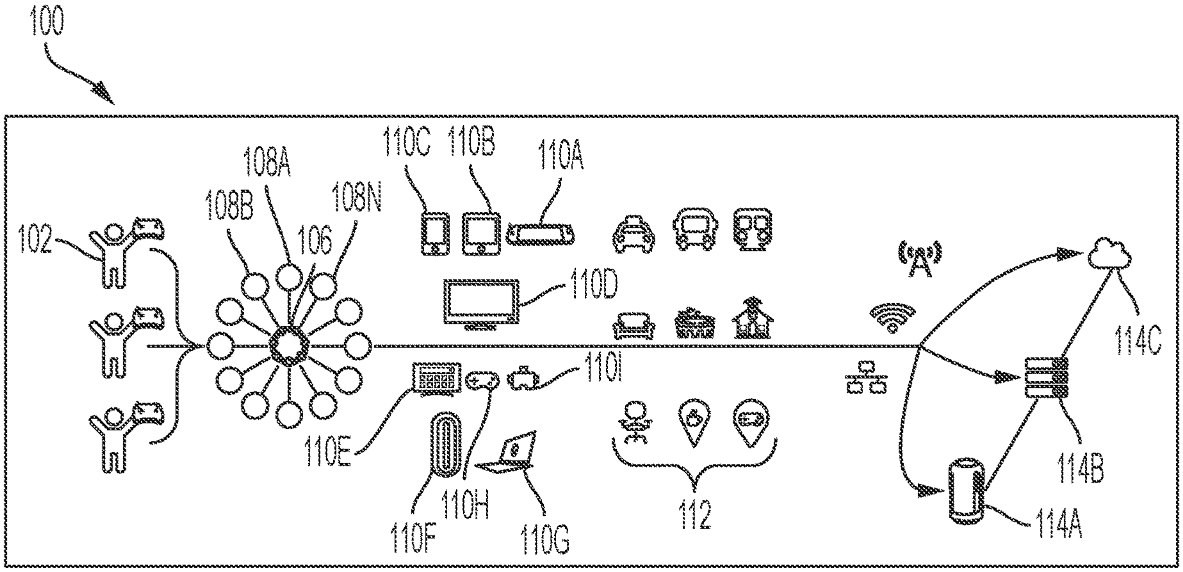
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
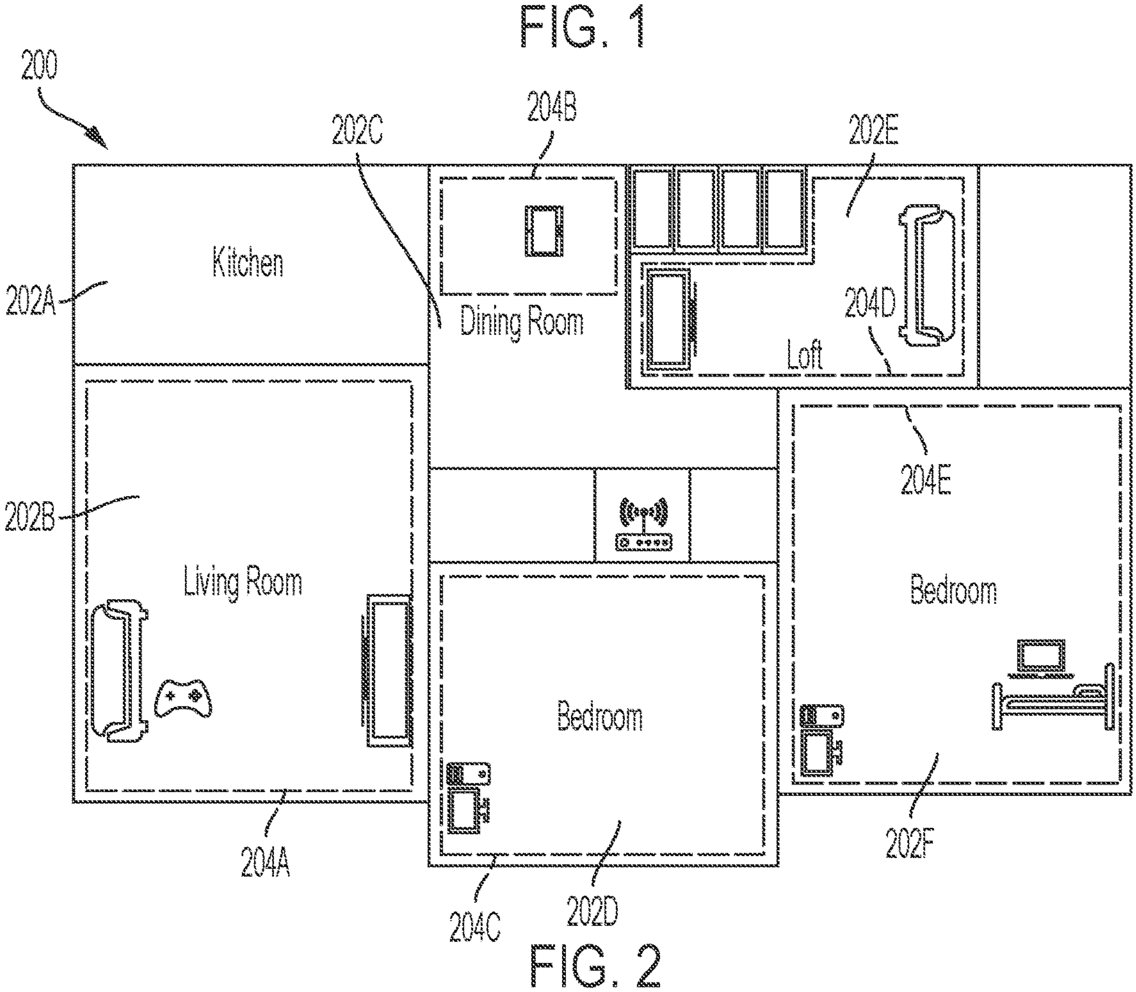
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
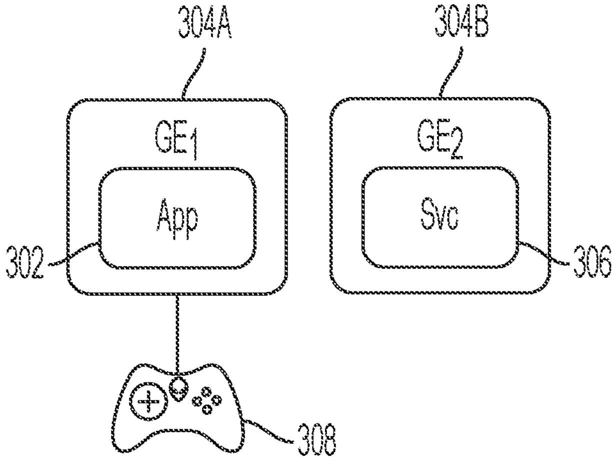
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
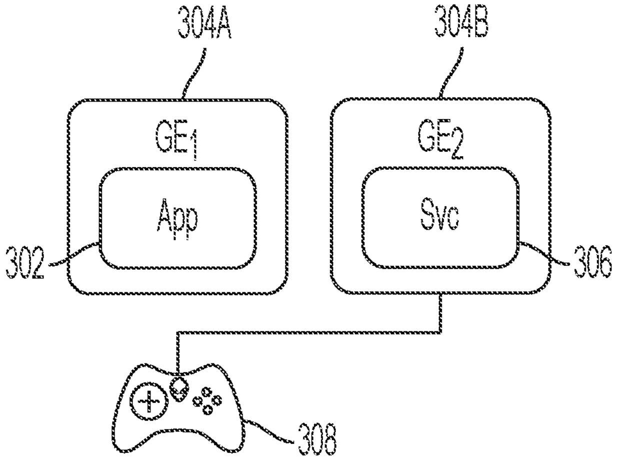
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
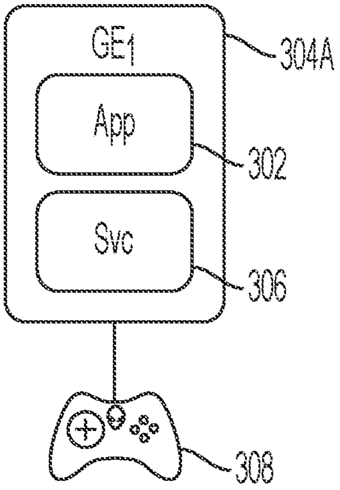
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
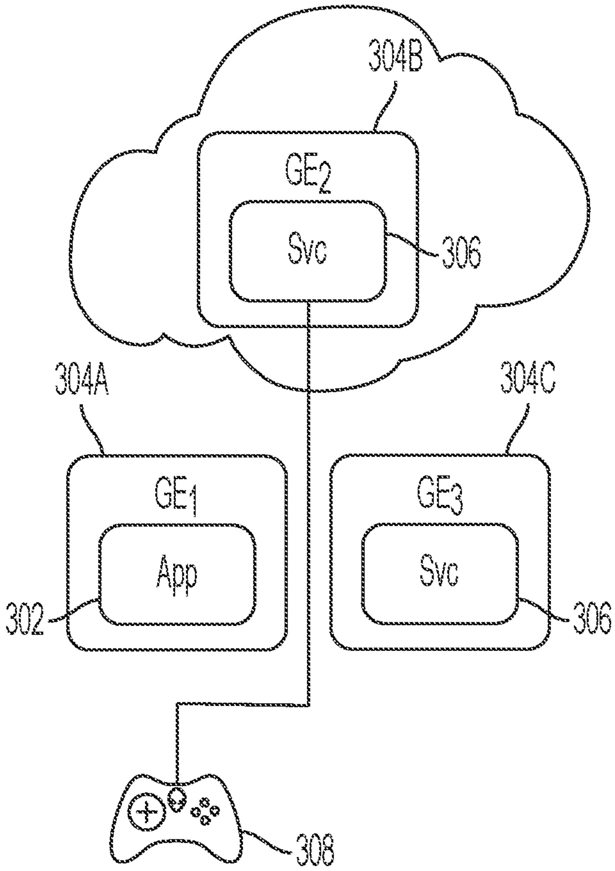
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
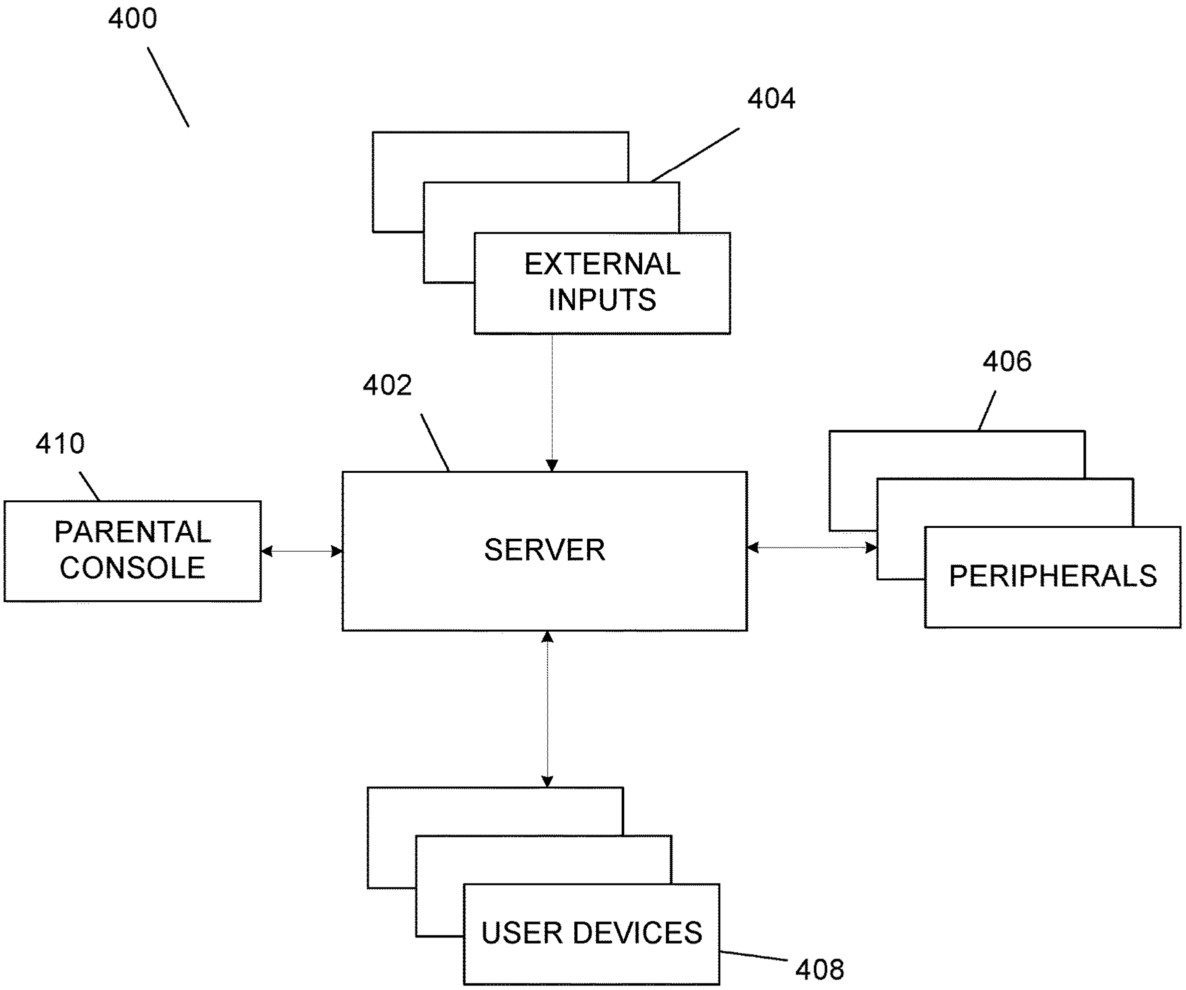
FIG. 4 is a block diagram illustrating a cloud-based service arrangement with associated inputs according to some embodiments of the disclosure.

FIG. 4 is a block diagram illustrating a cloud-based service arrangement with associated inputs according to some embodiments of the disclosure. The server 402 receives external inputs 404 from a plurality of sources. The external inputs 404 may include, for example, smart home devices, educational services, and/or a behavior characterization service. The server 402 communicates with peripherals 406 such as cameras, location trackers, timers, etc., to determine whether a task assigned to the user has been completed. A user device 408 may communicate with the server 402 to determine whether certain applications or features of the user device 408 are prohibited until task completion. The information handling system, or hub device, may be able to monitor interactions with or usage of user devices 408 to determine distraction of the user while completing less tangible tasks, such as homework. The parental console 410 may be accessed by any parent or guardian with the authority to assign tasks to the user and withhold entertainment content. The user may notify the server 402 of completion of a task via a user device 408, or the parent may update the task completion status via the parental console 410 in communication with the server 402.

Figure 5:
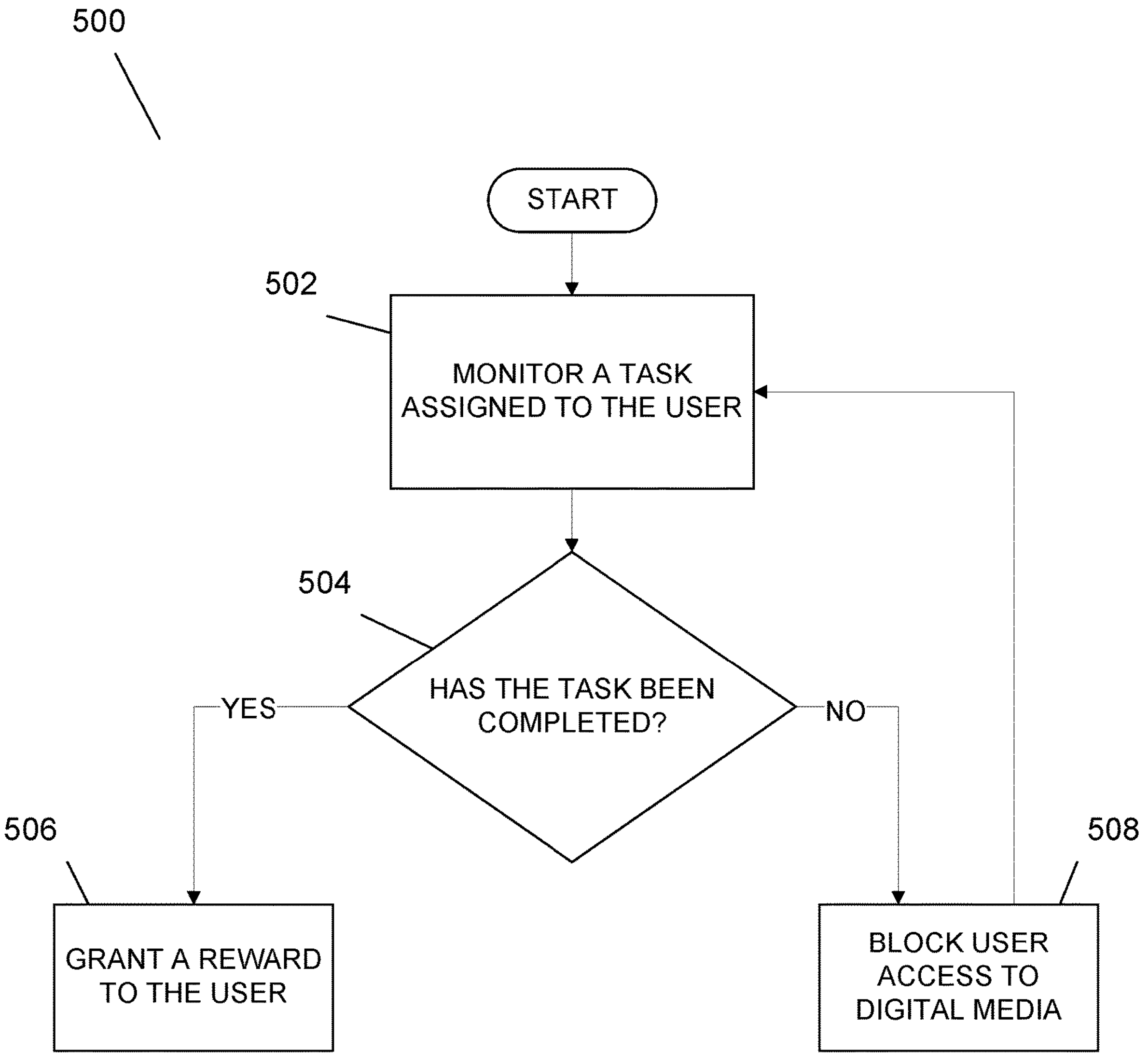
FIG. 5 is a flowchart diagram illustrating a method of monitoring task completion according to some embodiments of the disclosure.

FIG. 5 is a flowchart diagram illustrating a method of monitoring task completion according to some embodiments of the disclosure. Method 500 may be performed, for example, by an information handling system, such as a hub device. At block 502, the information handling system monitors a task assigned to the user. The information handling system may monitor the task completion, for example, through monitoring of the peripherals, external inputs, or user interaction with user devices. For example, if a user is assigned to complete homework in an expected time of one hour, the information handling system may determine whether the user has been in a certain predetermined location associated with the task, such as a bedroom or home office, for example, for at least the specified amount of time. The information handling system may also monitor user interaction with devices that may act as a distraction, such as a mobile device or gaming device in that location, to characterize how the task was completed. The information handling system may also receive external input from an external education source indicating that a homework assignment is complete (e.g., confirmation that an assignment file was uploaded to an educational website), at which time the information handling system can appropriately update the task. At block 504, the information handling system determines whether the task has been completed. If the task has been completed, the information handling system grants a reward to the user at block 506. The reward may be, for example, time allocation for use of digital media, enabling of in-game features, digital currency for in-game purchases, or an in-game reward. The reward may be access to certain games of a specific genre or maturity rating, or in-game capabilities. In-game rewards may be specific to a particular game or service. Digital currency is not limited to in-game currency, but may be considered credit or funds associated with the user's account for in-game purchases. The use of digital media is not limited to entertainment provided by the information handling system, but may be related to applications on any user device. If the task is not determined to be completed, the information handling system continues to block user access to digital media at block 508 and returns to block 502 to continue monitoring the task assigned to the user.

Figure 6:
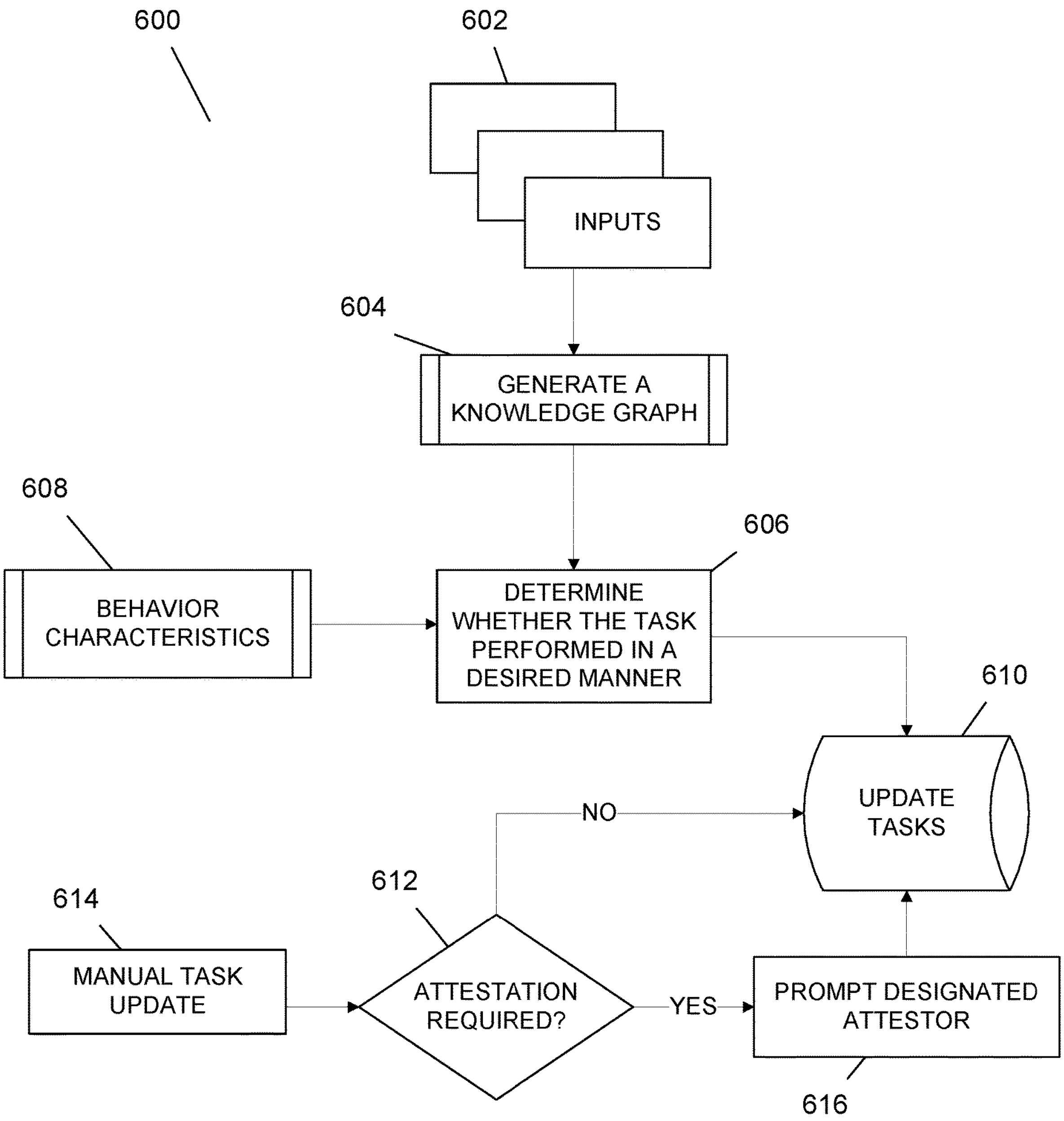
FIG. 6 is a flowchart diagram illustrating a method of updating completion status of tasks according to some embodiments of the disclosure.

FIG. 6 is a flowchart diagram illustrating a method of updating completion status of tasks according to some embodiments of the disclosure. Method 600 takes external inputs 602 such as an immersion measure, external software integration, location sensor, or other peripherals to generate a knowledge graph of rooms, trackers, tasks, and users at block 604. The information handling system may receive data such as behavior characteristics at block 608 in combination with the knowledge graph generated at block 604 to determine whether the task was performed in a desired manner at block 606. Behavior characteristics may include input from the parental console to determine whether the user completed the tasks in the desired manner as requested by the parent/guardian. The user may manually update the task to indicate completion at block 614. The information handling system checks whether attestation is required at block 612 from either a peripheral, the parent/guardian, or another source. If no attestation is required then the task is updated at block 610. If attestation is required, the attestor, such as the parent/guardian or another authority authorized to act as an attestor, provides confirmation as to whether the task has been completed at block 616. The task is updated according to the attestor's response at block 610.

Figure 7:
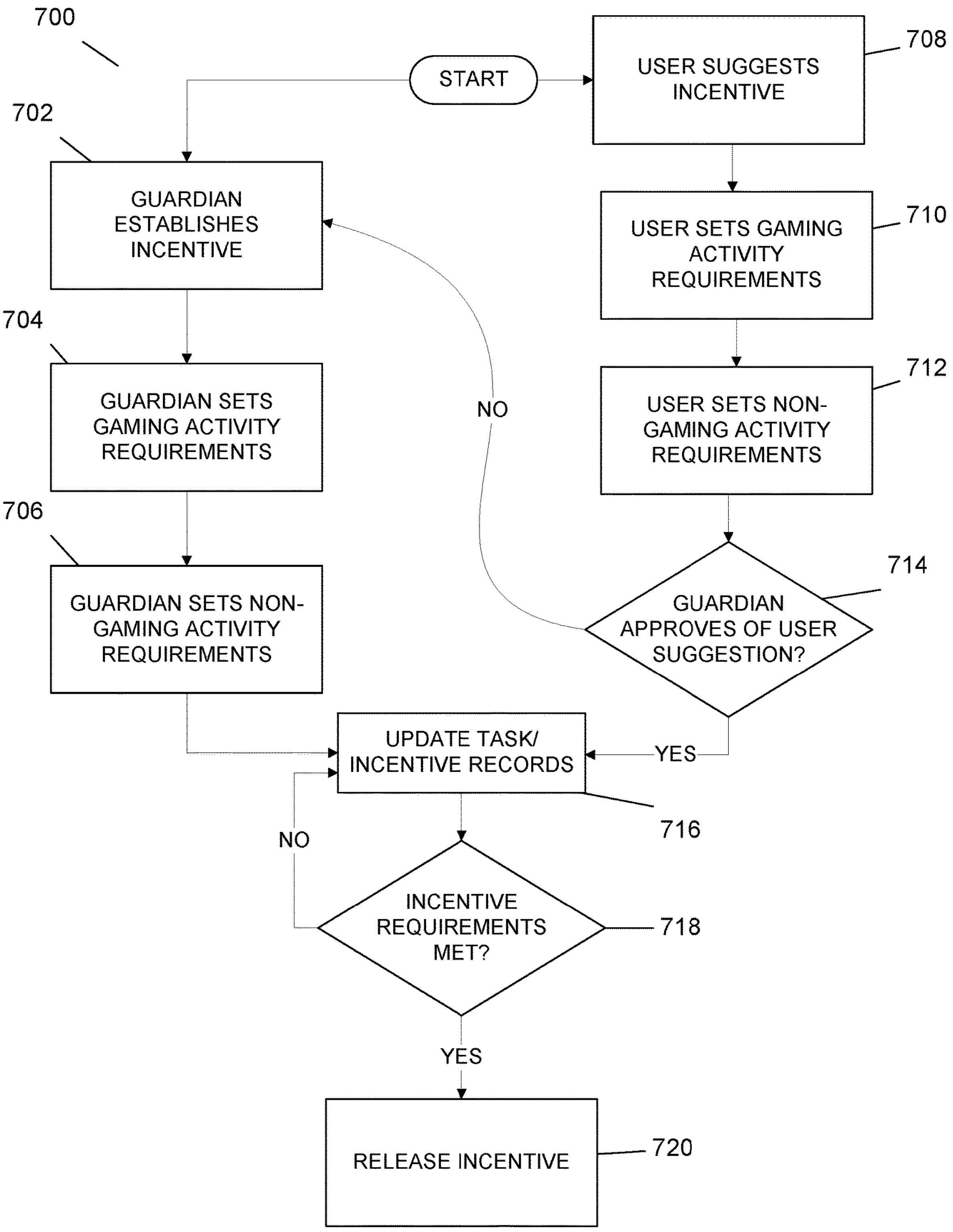
FIG. 7 is a flowchart diagram illustrating a method of determining the incentives to be granted to the user upon completion of a task according to some embodiments of the disclosure.

FIG. 7 is a flowchart diagram illustrating a method of determining the incentives to be granted to the user upon completion of a task according to some embodiments of the disclosure. Method 700 allows the user to suggest an incentive at block 708. The user may set gaming activity requirements at block 710 and non-gaming activity requirements at block 712. Gaming activity sources may include, for example, social interaction records, such as game social reputation or session feedback, mood characterization from chat, voice, and/or video sources, and conformance to gaming parental policies such as limiting gametime, game genres, and/or social interactions as directed by parent/guardian. Non-gaming activity sources may include, for example, self-attestation or proof of educational requirements, such as homework completion or maintaining grades at desired level, chore completion, or any other source of non-gaming activity. At block 714, the parent or guardian is asked to approve of the user suggestion. If the parent/guardian approves, the one or more tasks and incentive records are updated at block 716. If the parent/guardian does not approve of the user suggestion, then the parent/guardian establishes the incentive at block 702. The guardian sets the gaming activity requirements at block 704 and the non-gaming activity requirements at block 706. With the requirements and incentives established by the guardian, the tasks and incentive records are updated at block 716. If the incentive requirements have been met at block 718, the information handling system may release the incentive to the user at block 720. If the incentive requirements have not been met at block 718, then the task is updated at block 716 and the information handling system continues to monitor for completion.

Figure 8:
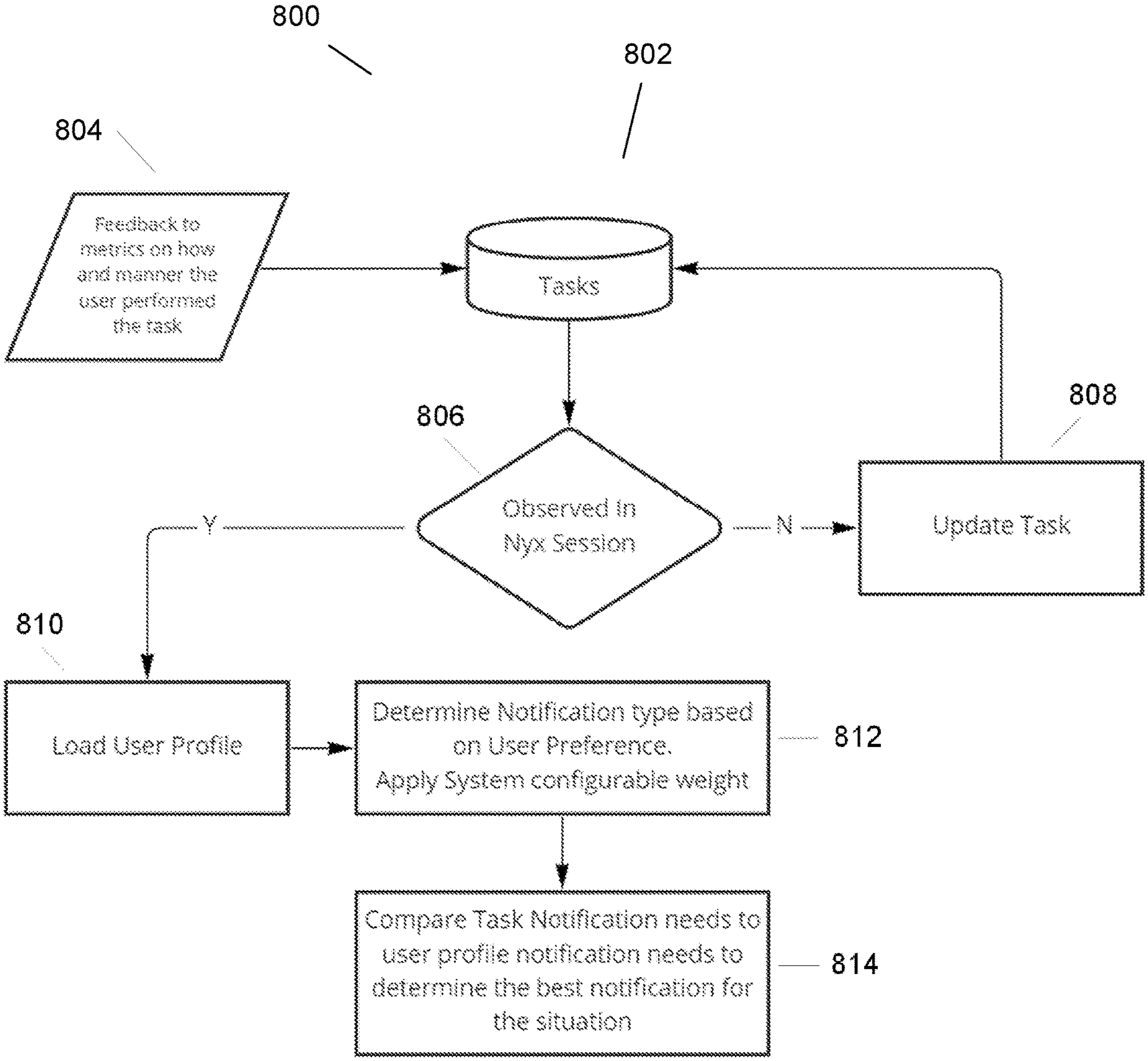
FIG. 8 is a flowchart diagram illustrating a method of determining a task notification to be sent to the user according to some embodiments of the disclosure.

FIG. 8 is a flowchart diagram illustrating a method of determining a task notification to be sent to the user according to some embodiments of the disclosure. Tasks 802 are updated based on feedback to metrics on the manner in which the user performed the task at block 804. This feedback may include the behavior characteristics and information from the knowledge graph of FIG. 6. If the user is observed to not be engaging with entertainment or digital media, such as playing a video game, on the information handling system at block 806, then the information handling system updates the task at block 808. If the user is observed engaging in, for example, a video game with unfinished tasks at block 806, then the information handling system loads the user profile at block 810. The information determines the notification type based on, at least in part, user preference and applies system configurable weight at block 812. At block 814, the information handling system compares task notification needs to user profile notification needs to determine the best notification for the situation. Different notifications may include, for example, a nudge, alert, or lock. A nudge may be a subtle message appearing along a border of the gaming display or in a corner, for example, with the purpose of providing an unobtrusive reminder to the user. An alert is more urgent than a nudge, blocking out at least a portion of the gaming display in a more obtrusive manner, such as a banner across the center of the screen. A lock would inhibit the user from engaging in the video game or other digital media by blocking access until the desired task is completed.

Figure 9:
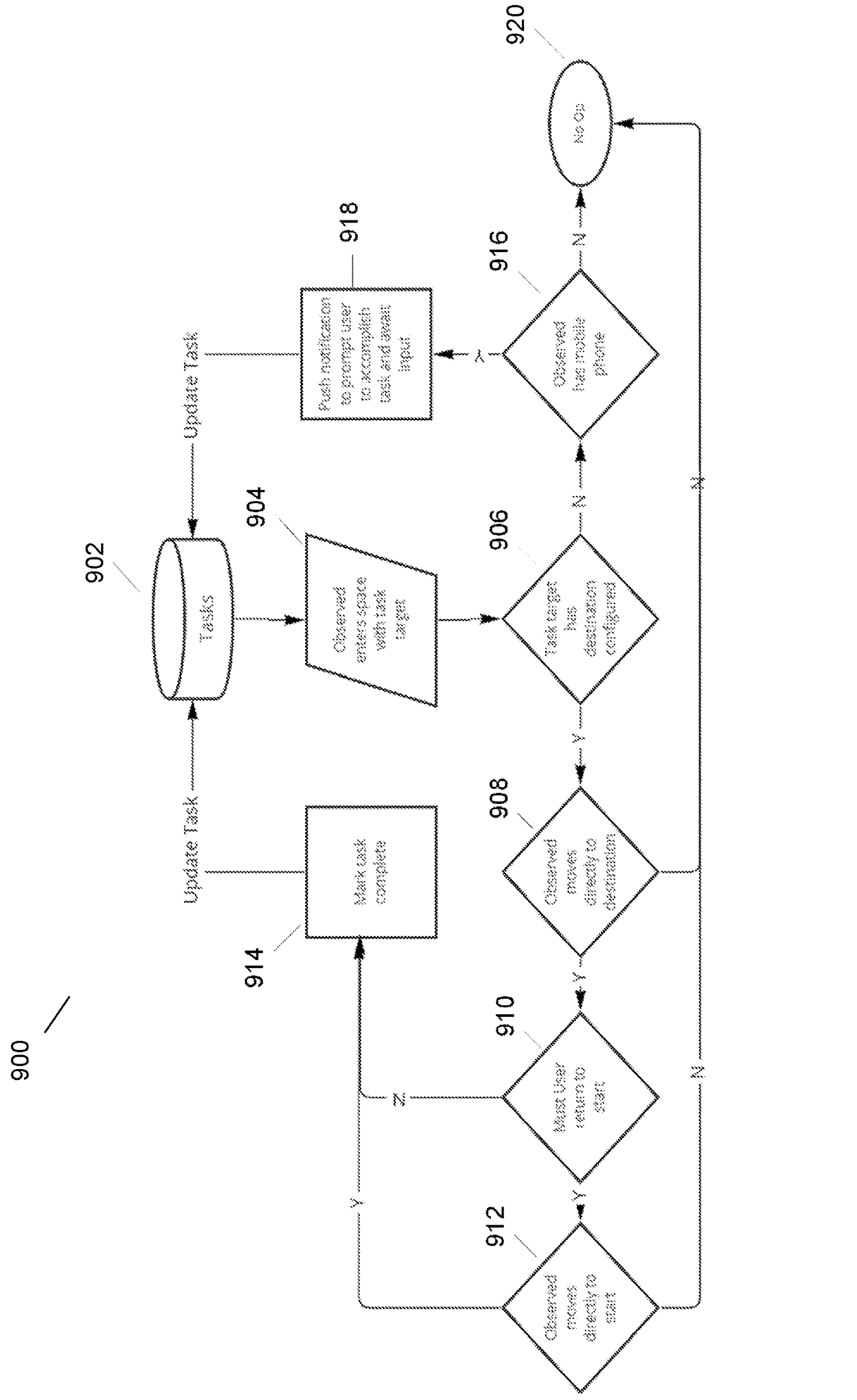
FIG. 9 is a flowchart diagram illustrating a method of tracking the physical location of the user to determine task completion according to some embodiments of the disclosure.

FIG. 9 is a flowchart diagram illustrating a method of tracking the physical location of the user to determine task completion according to some embodiments of the disclosure. Method 900 illustrates an observed user performing a task. There may be a known map, such as that shown in FIG. 2, stored on the information handling system comprising at least one target location according to some embodiments. The known map may include a layout of the user's home or gaming environment. Specific areas may be predefined as target locations associated with task targets or target objects. An observed user enters a space with a target object at block 904. In an example embodiment, the user is tasked with the chore of taking out the trash. The target object may be the trashcan which is identified in the known map in a target location such as the kitchen, for example. If the target object has a destination configured at block 906, such as the outdoor trash bin the garage, then the information handling system monitors whether the observed user moves directly from the task target location to the configured destination at block 908.

If the target does not have a destination configured at block 906, then the information handling system determines whether the observed user has a device capable of receiving notifications, such as a mobile phone at block 916. If the user does, then the information handling system prompts the user to accomplish the task and awaits input regarding completion at block 918, such as through self-attestation, then updates the tasks 902. If the user does not have a mobile device at block 916, then no further operation is performed by the information handling system at block 920.

If the user did move directly to the configured destination at block 908, being the garage in this example embodiment, then the information handling system continues to monitor whether the user must return to start according to the task at block 910. If the user did not move directly to the configured destination at block 908, then no further operation is taken by the information handling system at block 920.

After moving to the configured destination (garage) at block 908, the user may need to return the target object (trash can) to the original target location (kitchen) at block 910. The user would return to the starting target location at block 912, and the task would automatically be marked as complete by the information handling system at block 914, updating the tasks 902. If the user does not need to return to the starting target location at block 910, then the task is marked as complete by the information handling system at block 914. If it is determined at block 910 that the user must return to start, but the user does not do so at block 912, then the information handling system performs no operation at block 920.

Figure 10:
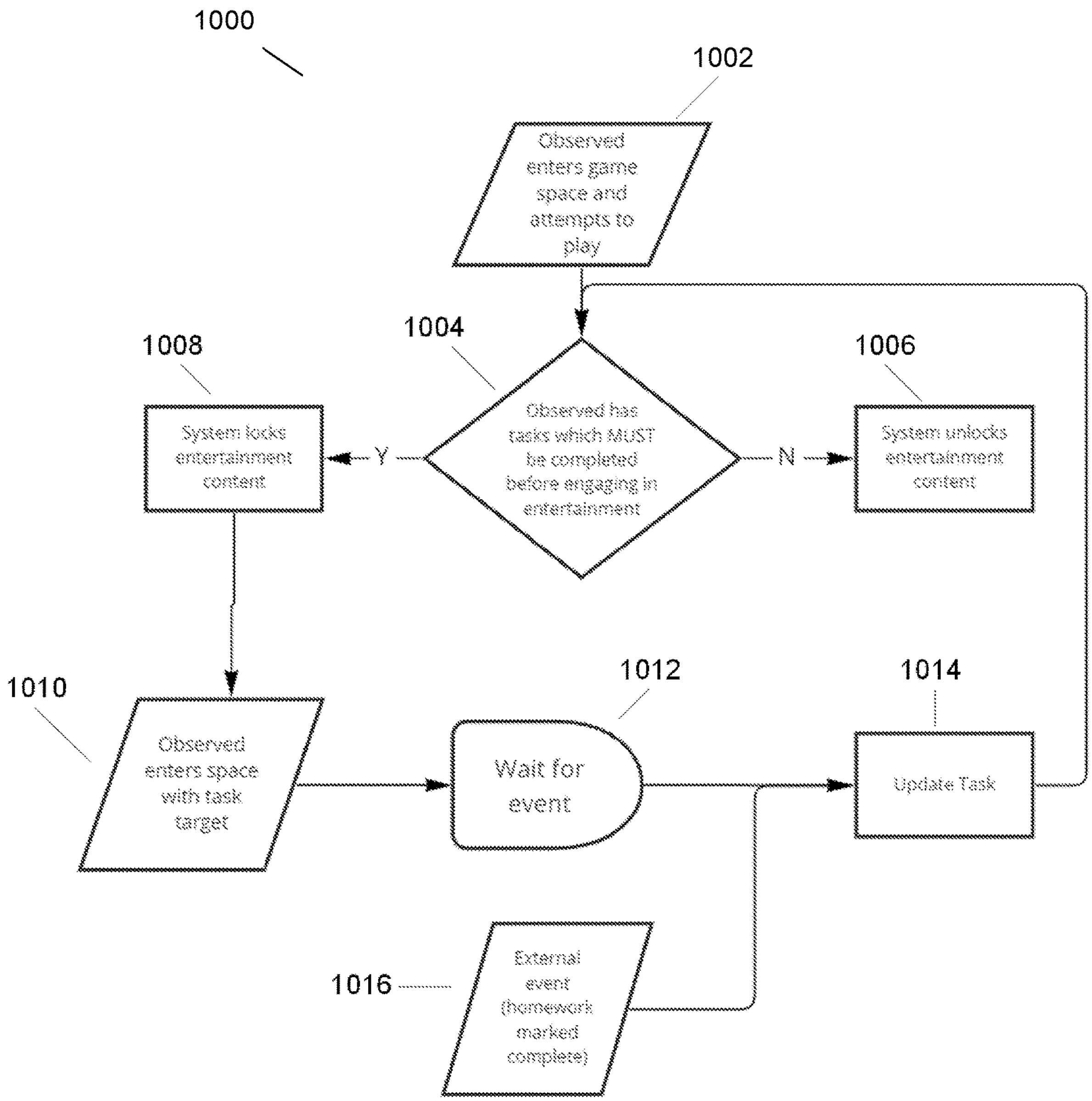
FIG. 10 is a flowchart diagram illustrating a method of withholding gameplay from the user until the task has been completed according to some embodiments of the disclosure.

FIG. 10 is a flowchart diagram illustrating a method of withholding gameplay from the user until the task has been completed according to some embodiments of the disclosure. Method 1000 may be performed, for example, by an information handling system, such as a hub device. At block 1002, the observed user enters the game space and attempts to play. This is identifiable using physical location tracking of the user to determine the user's location on the known map stored in the information handling system. An area associated with gameplay may be identified on the map as a specific room, for example. At block 1004, the information handling system checks if the observed user has tasks assigned that must be completed before engaging in gameplay or any other digital media. If not, then the information handling system unlocks the entertainment content and allows use at block 1006. If the user does have tasks that must be completed, the information handling system locks the entertainment content at block 1008.

The information handling system monitors the user's movements and observes the user entering a space with a task target or target object at block 1010. The information handling system waits for an indication of completion of the task at block 1012. The indication may be an external event at block 1016 with the task being marked as complete. The indication may be any input from the user, parent/guardian, or automatically determined by the information handling system based on, at least in part, the movement of the user monitored by the location tracking system. The indication may be received from an external peripheral or device, such as a timer, camera, external education source, or smart home device/ecosystem attestation, for example. After the external event or indication has been complete, the task is updated at block 1014 and the information continues to check if the observed user has tasks which must be complete before engaging in entertainment or gameplay at block 1004.

Figure 11:
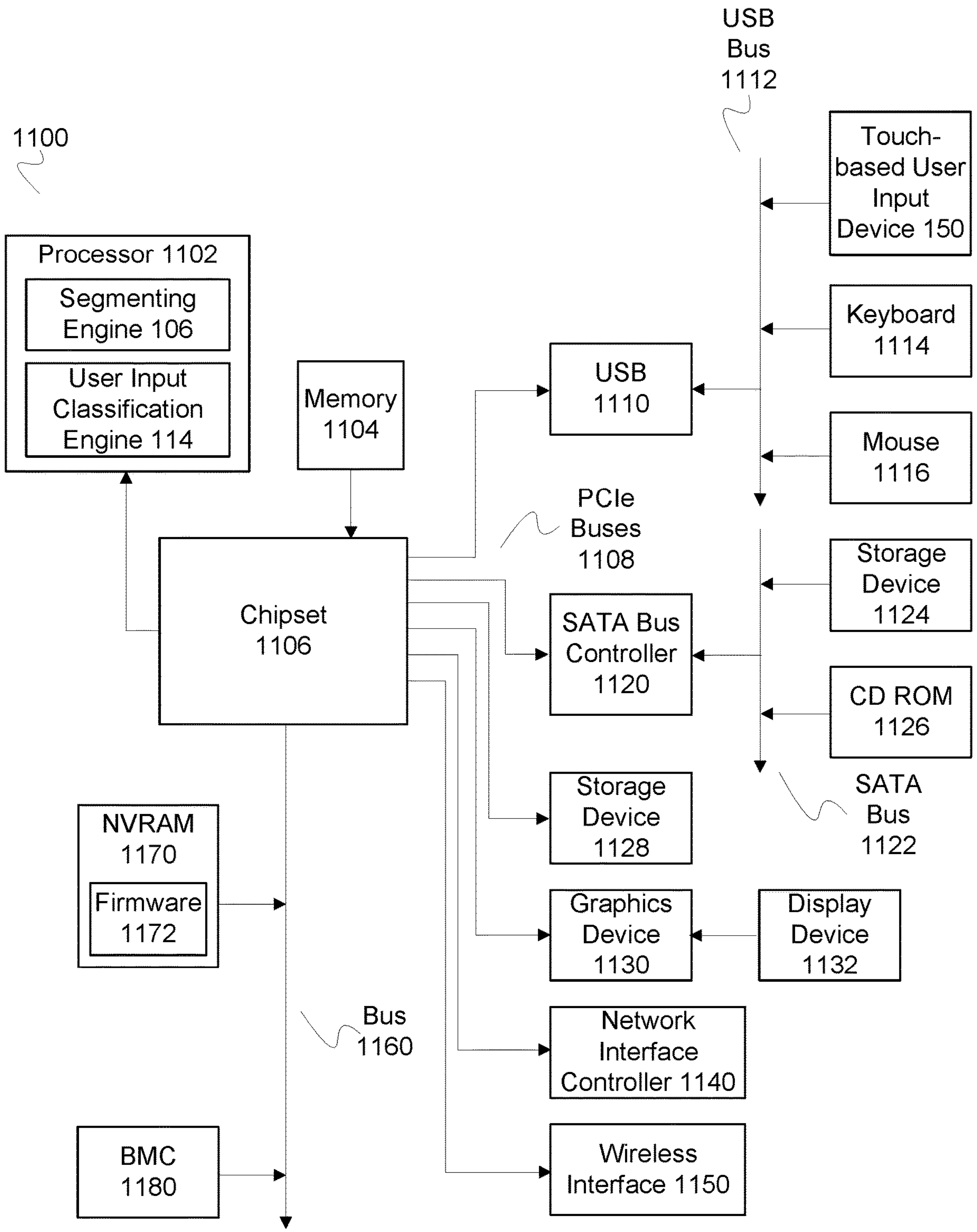
FIG. 11 is a schematic block diagram of an example information handling system according to some embodiments of the disclosure.

FIG. 11 illustrates an example information handling system 1100. Information handling system 1100 may include a processor 1102 (e.g., a central processing unit (CPU)), a memory (e.g., a dynamic random-access memory (DRAM)) 1104, and a chipset 1106. In some embodiments, one or more of the processor 1102, the memory 1104, and the chipset 1106 may be included on a motherboard (also referred to as a mainboard), which is a printed circuit board (PCB) with embedded conductors organized as transmission lines between the processor 1102, the memory 1104, the chipset 1106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1102, the memory 1104, the chipset 1106, and/or other components may be organized as a System on Chip (SoC).

The processor 1102 may execute program code by accessing instructions loaded into memory 1104 from a storage device, executing the instructions to operate on data also loaded into memory 1104 from a storage device, and generate output data that is stored back into memory 1104 or sent to another component. The processor 1102 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1106 may facilitate the transfer of data between the processor 1102, the memory 1104, and other components. In some embodiments, chipset 1106 may include two or more integrated circuits (ICs), such as a northbridge controller coupled to the processor 1102, the memory 1104, and a southbridge controller, with the southbridge controller coupled to the other components such as USB 1110, SATA 1120, and PCIe buses 1108. The chipset 1106 may couple to other components through one or more PCIe buses 1108.

Some components may be coupled to one bus line of the PCIe buses 1108, whereas some components may be coupled to more than one bus line of the PCIe buses 1108. One example component is a universal serial bus (USB) controller 1110, which interfaces the chipset 1106 to a USB bus 1112. A USB bus 1112 may couple input/output components such as a keyboard 1114 and a mouse 1116, but also other components such as USB flash drives, or another information handling system. Another example component is a SATA bus controller 1120, which couples the chipset 1106 to a SATA bus 1122. The SATA bus 1122 may facilitate efficient transfer of data between the chipset 1106 and components coupled to the chipset 1106 and a storage device 1124 (e.g., a hard disk drive (HDD) or solid-state disk drive (SDD)) and/or a compact disc read-only memory (CD-ROM) 1126. The PCIe bus 1108 may also couple the chipset 1106 directly to a storage device 1128 (e.g., a solid-state disk drive (SDD)). A further example of an example component is a graphics device 1130 (e.g., a graphics processing unit (GPU)) for generating output to a display device 1132, a network interface controller (NIC) 1140, and/or a wireless interface 1150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1106 may also be coupled to a serial peripheral interface (SPI) and/or Inter-Integrated Circuit (I2C) bus 1160, which couples the chipset 1106 to system management components. For example, a non-volatile random-access memory (NVRAM) 1170 for storing firmware 1172 may be coupled to the bus 1160. As another example, a controller, such as a baseboard management controller (BMC) 1180, may be coupled to the chipset 1106 through the bus 1160. BMC 1180 may be referred to as a service processor or embedded controller (EC). Capabilities and functions provided by BMC 1180 may vary considerably based on the type of information handling system. For example, the term baseboard management system may be used to describe an embedded processor included at a server, while an embedded controller may be found in a consumer-level device. As disclosed herein, BMC 1180 represents a processing device different from processor 1102, which provides various management functions for information handling system 1100. For example, an embedded controller may be responsible for power management, cooling management, and the like. An embedded controller included at a data storage system may be referred to as a storage enclosure processor or a chassis processor.

System 1100 may include additional processors that are configured to provide localized or specific control functions, such as a battery management controller. Bus 1160 can include one or more busses, including a Serial Peripheral Interface (SPI) bus, an Inter-Integrated Circuit (I2C) bus, a system management bus (SMBUS), a power management bus (PMBUS), or the like. BMC 1180 may be configured to provide out-of-band access to devices at information handling system 1100. Out-of-band access in the context of the bus 1160 may refer to operations performed prior to execution of firmware 1172 by processor 1102 to initialize operation of system 1100.

Firmware 1172 may include instructions executable by processor 1102 to initialize and test the hardware components of system 1100. For example, the instructions may cause the processor 1102 to execute a power-on self-test (POST). The instructions may further cause the processor 1102 to load a boot loader or an operating system (OS) from a mass storage device. Firmware 1172 additionally may provide an abstraction layer for the hardware, such as a consistent way for application programs and operating systems to interact with the keyboard, display, and other input/output devices. When power is first applied to information handling system 1100, the system may begin a sequence of initialization procedures, such as a boot procedure or a secure boot procedure. During the initialization sequence, also referred to as a boot sequence, components of system 1100 may be configured and enabled for operation and device drivers may be installed. Device drivers may provide an interface through which other components of the system 1100 can communicate with a corresponding device. The firmware 1172 may include a basic input-output system (BIOS) and/or include a unified extensible firmware interface (UEFI). Firmware 1172 may also include one or more firmware modules of the information handling system. Additionally, configuration settings for the firmware 1172 and firmware of the information handling system 1100 may be stored in the NVRAM 1170. NVRAM 1170 may, for example, be a non-volatile firmware memory of the information handling system 1100 and may store a firmware memory map namespace of the information handling system. NVRAM 1170 may further store one or more container-specific firmware memory map namespaces for one or more containers concurrently executed by the information handling system.

Information handling system 1100 may include additional components and additional busses, not shown for clarity. For example, system 1100 may include multiple processor cores (either within processor 1102 or separately coupled to the chipset 1106 or through the PCIe buses 1108), audio devices (such as may be coupled to the chipset 1106 through one of the PCIe busses 1108), or the like. While a particular arrangement of bus technologies and interconnections is illustrated for the purpose of example, one of skill will appreciate that the techniques disclosed herein are applicable to other system architectures. System 1100 may include multiple processors and/or redundant bus controllers. In some embodiments, one or more components may be integrated together in an integrated circuit (IC), which is circuitry built on a common substrate. For example, portions of chipset 1106 can be integrated within processor 1102. Additional components of information handling system 1100 may include one or more storage devices that may store machine-executable code, one or more communications ports for communicating with external devices, and various input and output (I/O) devices, such as a keyboard, a mouse, and a video display.

In some embodiments, processor 1102 may include multiple processors, such as multiple processing cores for parallel processing by the information handling system 1100. For example, the information handling system 1100 may include a server comprising multiple processors for parallel processing. In some embodiments, the information handling system 1100 may support virtual machine (VM) operation, with multiple virtualized instances of one or more operating systems executed in parallel by the information handling system 1100. For example, resources, such as processors or processing cores of the information handling system may be assigned to multiple containerized instances of one or more operating systems of the information handling system 1100 executed in parallel. A container may, for example, be a virtual machine executed by the information handling system 1100 for execution of an instance of an operating system by the information handling system 1100. Thus, for example, multiple users may remotely connect to the information handling system 1100, such as in a cloud computing configuration, to utilize resources of the information handling system 1100, such as memory, processors, and other hardware, firmware, and software capabilities of the information handling system 1100. Parallel execution of multiple containers by the information handling system 1100 may allow the information handling system 1100 to execute tasks for multiple users in parallel secure virtual environments.

The schematic or flow chart diagrams of FIG. 5, FIG. 6, FIG. 7, FIG. 8, FIG. 9, and FIG. 10 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

monitoring, by an information handling system, a task assigned to be completed by a user;

blocking, by the information handling system, access to digital media comprising an application until the task is determined to be completed;

determining, by the information handling system, completion of the task by the user based, at least in part, on a physical location tracking of the user, wherein the physical location tracking of the user comprises:

monitoring, by the information handling system, a controller; and comparing, by the information handling system, monitored controller movements to a known map stored on the information handling system; and granting, by the information handling system, access to the digital media to the user in response to determining completion of the task.

2. The method of claim 1, wherein the known map comprises at least one target location.

3. The method of claim 1, wherein determining completion of the task by the user comprises receiving an indication of completion from at least one peripheral of the information handling system.

4. The method of claim 1, further comprising granting a reward to the user based on determining completion of the task, the reward comprising at least one of:

enabling of in-game features, digital currency for in-game purchases, or an in-game reward.

5. The method of claim 1, further comprising sending, by the information handling system, a notification to the user to complete the task.

6. An information handling system, comprising:

a memory;

a processor coupled to the memory, wherein the processor is configured to perform steps comprising:

monitoring, by a hub device, a task assigned to be completed by a user;

blocking, by the information handling system, access to digital media comprising an application until the task is determined to be completed;

determining, by the hub device, completion of the task by the user based, at least in part, on a physical location tracking of the user, wherein the physical location tracking of the user comprises:

monitoring, by the hub device, a controller; and comparing, by the hub device, monitored controller movements to a known map stored on the information handling system; and granting, by the information handling system, access to the digital media to the user in response to determining completion of the task.

7. The information handling system of claim 6, wherein the known map comprises at least one target location.

8. The information handling system of claim 6, wherein determining completion of the task by the user comprises receiving an indication of completion from at least one peripheral of the information handling system.

9. The information handling system of claim 6, further comprising granting a reward to the user based on determining completion of the task, the reward comprising at least one of:

enabling of in-game features, digital currency for in-game purchases, or an in-game reward.

10. The information handling system of claim 6, further comprising sending, by the information handling system, a notification to the user to complete the task.

11. A computer program product, comprising:

a non-transitory computer readable medium comprising code for performing steps comprising:

monitoring, by a hub device, a task assigned to be completed by a user;

blocking, by the information handling system, access to digital media comprising an application until the task is determined to be completed;

determining, by the hub device, completion of the task by the user based, at least in part, on a physical location tracking of the user, wherein the physical location tracking of the user comprises:

monitoring, by the hub device, a controller; and comparing, by the hub device, monitored controller movements to a known map; and granting, by the information handling system, access to the digital media to the user in response to determining completion of the task.

12. The computer program product of claim 11, wherein the known map comprises at least one target location.

13. The computer program product of claim 11, wherein determining completion of the task by the user comprises receiving an indication of completion from at least one peripheral of the hub device.

14. The computer program product of claim 11, further comprising granting a reward to the user based on determining completion of the task, the reward comprising at least one of:

enabling of in-game features, digital currency for in-game purchases, or an in-game reward.

15. The method of claim 1, wherein the digital media comprises a video game.

16. The method of claim 1, further comprising:

receiving, by the information handling system, an attestation from an attestor of the determining the completion of the task, wherein granting access to the digital media is further based on the attestation.

17. The method of claim 16, further comprising:

determining, by the information handling system, whether completion of the task requires the attestation; and prompting, by the information handling system, the attestor to attest to the determining the completion of the task, wherein the prompting is based on the determining the completion of the task.

* * * * *